April 12, 1927. 1,624,864
O. H. FLETCHER ET AL
SAW SHARPENING MACHINE
Filed Aug. 3, 1922 4 Sheets-Sheet 3
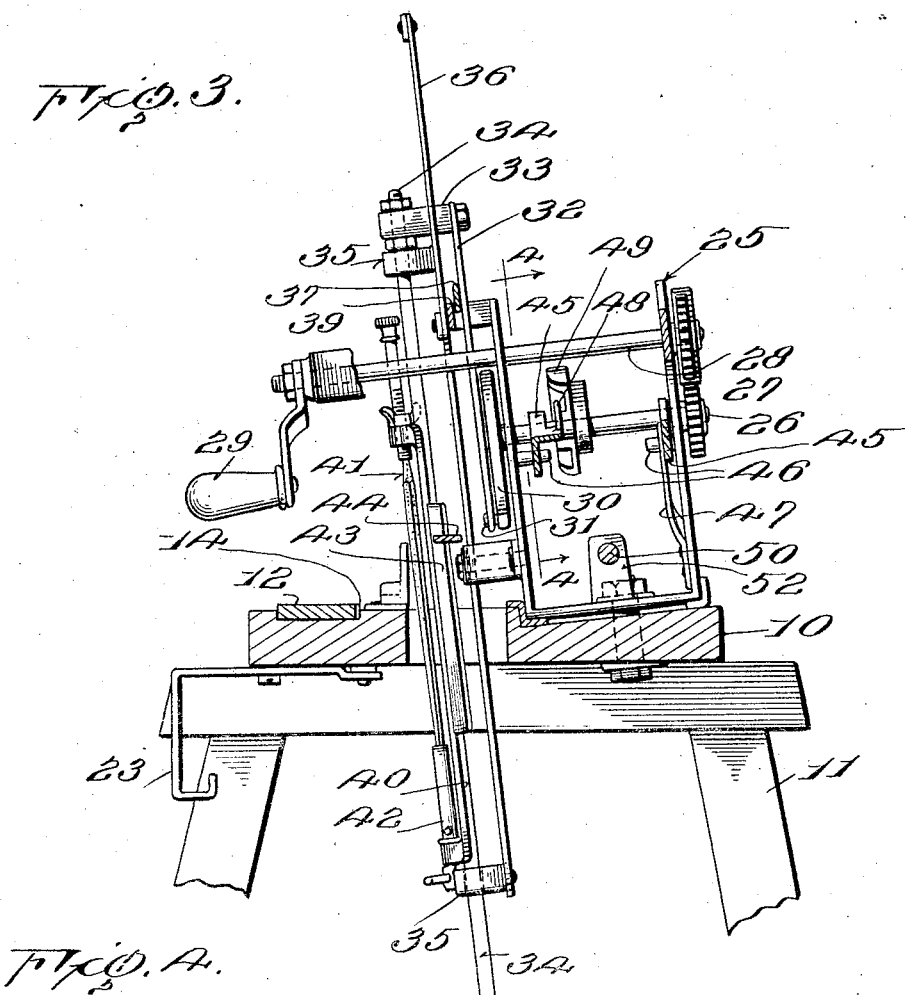
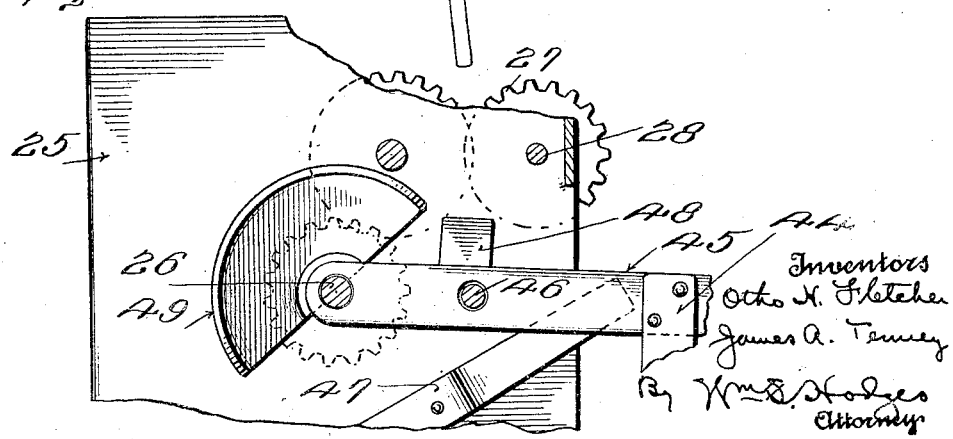

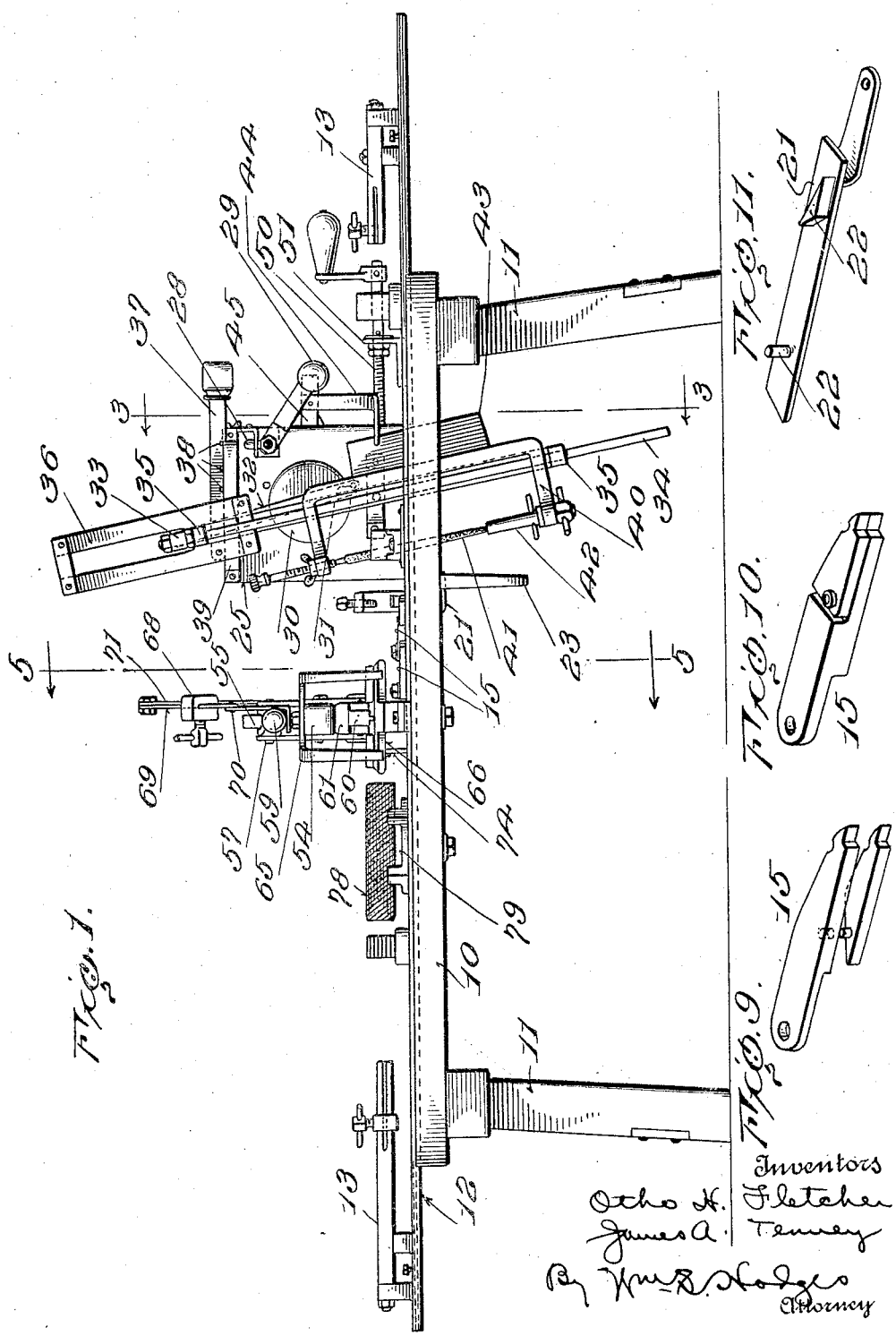

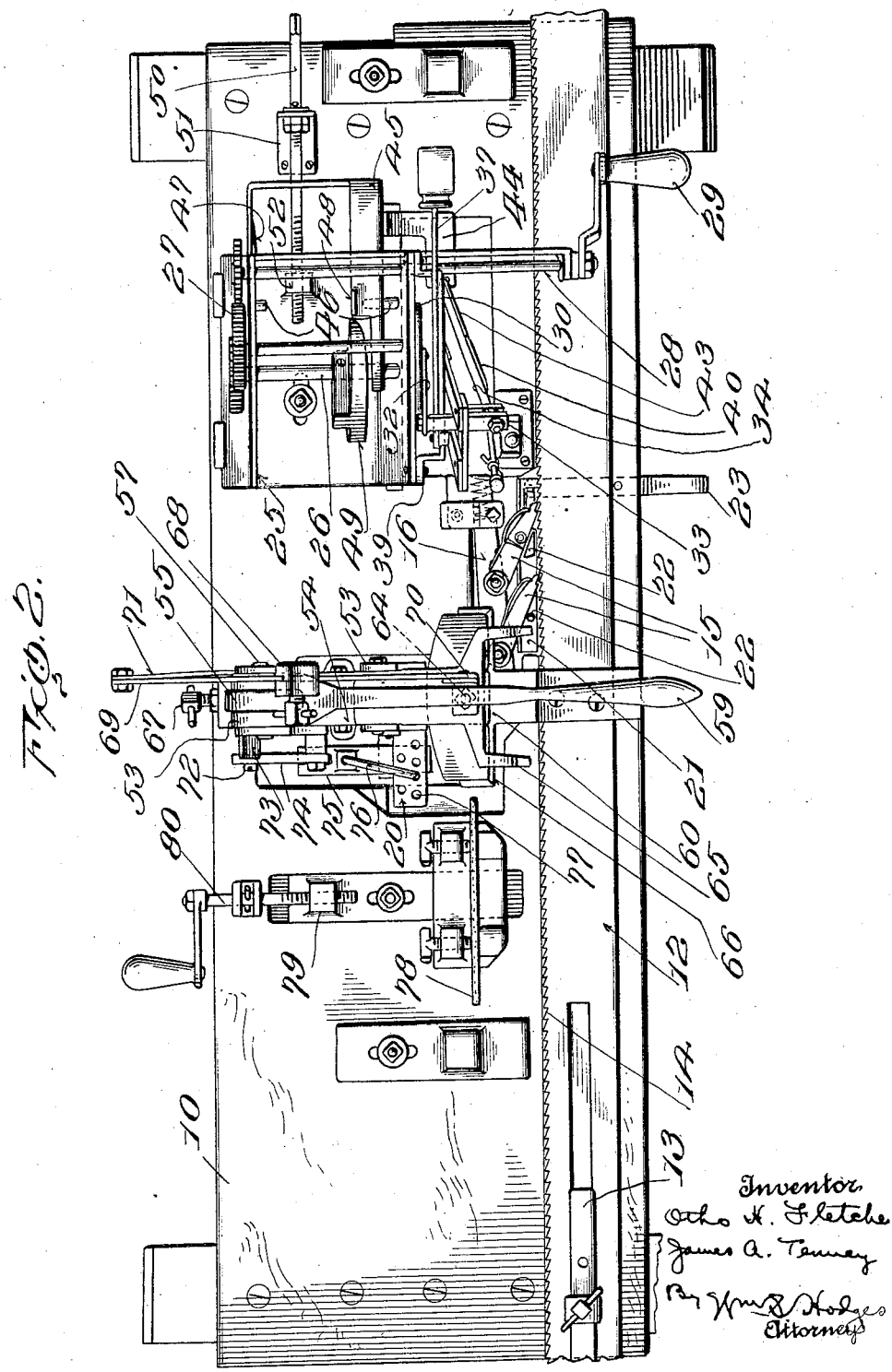

April 12, 1927.
O. H. FLETCHER ET AL
1,624,864
SAW SHARPENING MACHINE
Filed Aug. 3, 1922    4 Sheets-Sheet 4
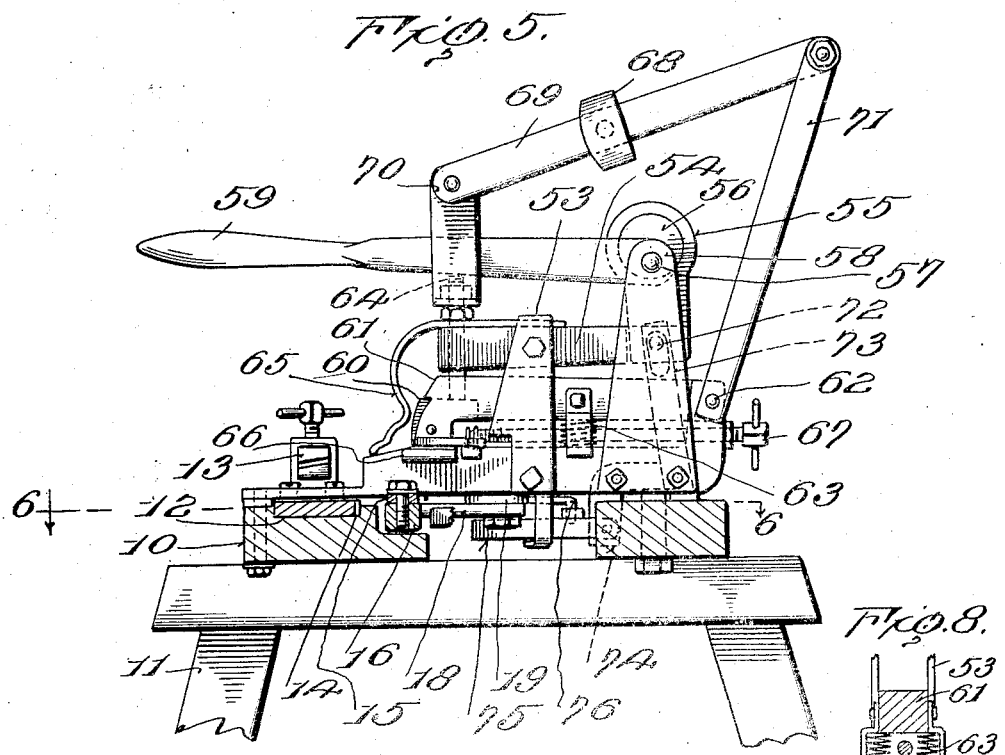
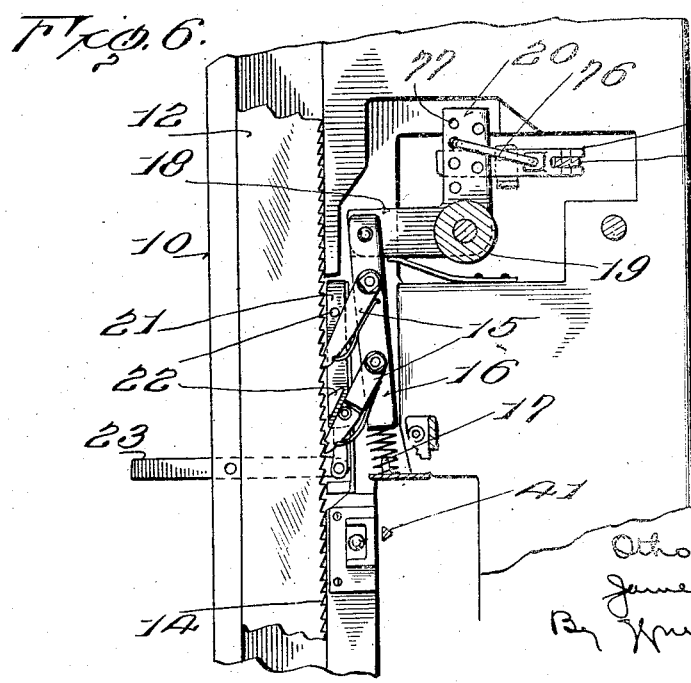
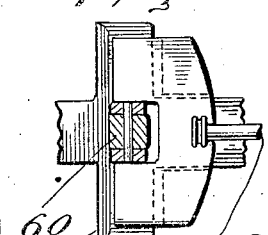

Patented Apr. 12, 1927.

1,624,864

UNITED STATES PATENT OFFICE.

OTHO H. FLETCHER AND JAMES A. TENNEY, OF QUEENS, WEST VIRGINIA.

SAW-SHARPENING MACHINE.

Application filed August 3, 1922. Serial No. 579,418.

This invention is a machine for renewing the cutting edges of saw teeth, and also for imparting the necessary set to the teeth, conjointly with the sharpening operation.

One of the objects of the invention is to provide a machine of the character mentioned, having saw-tooth-sharpening means and saw-tooth-setting means, and simple means for advancing the saw with respect thereto by a step by step movement. A further object is to provide a support having a standard saw file mounted to reciprocate and oscillate with respect to the saw blade, the movements thereof being so timed that the file will sharpen the tooth and subsequently move away from the same. A further object is to provide means by which the file carrier may be adjusted to make cuts of different depths. A further object is to provide simple means for relatively timing the reciprocations and oscillations of the file carrier. A further object is to provide a machine of the character described, having efficient means by which the proper set may be imparted to the teeth. A further object is to provide a machine of the character mentioned, in which the saw-supporting carriage is advanced by mechanism controlled by movement of the tooth setting mechanism. A further object is to provide sharpening and setting mechanisms, independently adjustable to conform to saws and teeth of different styles and dimensions. A further object is to provide feeding mechanism capable of being varied to conform to the size and spacing of the teeth to be acted upon.

The invention will be hereinafter fully set forth and particularly pointed out in the claims.

In the accompanying drawings:—

Figure 1 is a front elevation illustrating a machine constructed in accordance with the invention. Figure 2 is a top plan view thereof. Figure 3 is a transverse sectional view on the line 3—3, Figure 1, illustrating the file actuating mechanism. Figure 4 is a detail transverse sectional view illustrating the file actuating mechanism. Figure 5 is a sectional view on the line 5—5, Figure 1, illustrating the saw setting mechanism, parts being broken away. Figure 6 is an enlarged detail plan view illustrating the carriage feeding mechanism. Figure 7 is a detail view illustrating the saw setting device. Figure 8 is a detail sectional view illustrating the yieldable support for the saw set carrier. Figures 9, 10 and 11 are detail views illustrating the carriage feeding device.

Referring to the drawings, 10 designates a table supported in any suitable manner, as by legs or pedestals 11. Reciprocably mounted in a suitable guideway upon said table is the saw carriage 12, provided with adjustably mounted holding devices 13, by which the saw to be operated upon is supported. The inner edge of the saw carriage is provided with teeth or notches 14, which are engaged by spring pressed feeding pawls 15, pivotally mounted upon a slide 16, arranged to move in a line parallel with the carriage. Said slide is held in a normally retracted position by means of a spring 17, bearing against one end thereof, the other end of the slide being connected to an arm 18, of a bell crank lever pivotally mounted in the support 19, the other arm 20 of the bell crank lever being connected to actuating mechanism to be later described.

For the purpose of disengaging the pawls 15 from the teeth or notches 14, a pawl-disengaging slide 21 is arranged to reciprocate between the carriage 12 and the slide 16, said pawl-disengaging slide being provided with upwardly extended projections 22, positioned to engage the pawls and to move them out of engagement with the teeth 14, when the slide 21 is moved to the right as viewed in Figure 1, by means of the lever 23.

The saw-sharpening mechanism comprises a supporting frame 25, in which is rotatably mounted a cam shaft 26, actuated by suitable gearing 27, driven by a shaft 28, provided with crank handle 29. Secured to said cam shaft is a crank disk or eccentric 30, having a crank pin 31 to which is connected one end of a pitman 32. The other end of the pitman is connected to a crosshead 33, to which is connected a rod 34, mounted to reciprocate and to rock in bearings 35. Said bearings are carried by a frame 36, pivotally supported by the frame 25, and normally held against pivotal movement by a bar lever 37, having notches 38, positioned to engage a lock bar 39 on the frame 25. Secured to said rod 34 is a file-carrying frame 40, having arms in which the file 41 is mounted, said frame 40 being provided with an adjustable chuck 42, so that files of different lengths may be secured within the frame 40. Said frame 40 is provided with a fin-like extension 43, which is engaged by the forked end of an arm 44, rigidly secured to a movable frame 45, which is free to slide transversely of the machine on suitable studs 46, carried by the frame 25. The frame 45 is normally held in a rearward position by means of a spring 47, and said face is also provided with a projection 48 to be engaged by a cam 49 secured to and rotatable with the cam shaft 26. Inasmuch as the rod 34 rocks in the bearings 35, the effect obtained is that of rocking the file-carrying frame on an axis parallel with its line of reciprocation.

The frame 25 is slidable longitudinally of the table 10, and may be adjusted as desired, by means of the adjusting screw 50 mounted in a support 51, secured to the table and engaging a threaded lug 52, secured to said supporting frame. It is obvious that by rotating the screw 50 in either direction, corresponding longitudinal movement will be imparted to said frame.

The saw-setting mechanism comprises the support 19 provided with arms 53, in which is pivotally mounted a saw-set lever 54, one end of which is connected with an actuating arm 55, provided with a seat for an eccentric 56. Said eccentric is secured to a shaft 57, mounted in bearings 58, secured to the support 19 and connected to an operating lever 59. The saw-setting device 60 is mounted in one end of a carrier 61, the other end of which is pivoted at 62 in the support 19, said carrier being held normally elevated by means of springs 63, so that the front end thereof normally presses against a bearing stud 64 extending through the lever 54. Said lever 54 is provided with fingers 65, positioned to bear against the saw and to hold it firmly as pressure is being applied to the saw-set device. The saw-set device 60 co-operates with a die plate 66, which is adjustable laterally of the table 10 by means of an adjusting screw 67, as shown. To limit the throw of the lever 59, a stop gage 68 is provided, the same being mounted upon an arm 69, the front end of which is pivotally connected to a finger 70 secured to the saw-set lever 54, the other end of said arm being pivotally supported by an arm 71, having its lower end in engagement with the pivot 62.

The rear end of the saw-set lever 54 is provided with a finger or projection 72, engaged by an operating arm 73, which is connected to a bell crank lever 74 which operates a slide 75. Said slide 75 is connected with the bell crank arm 20 by means of a link 76, said bell crank arm 20 having a plurality of openings 77 formed therein, to be selectively engaged by said link, whereby the distance of movement of said arm 20 may be selectively varied.

For the purpose of jointing the saw teeth prior to setting them, the file 78 is secured to the front end of a slide 79, reciprocated by means of a screw 80.

In practice, a saw is attached to the saw carriage 12, by means of the holding devices 13, and the jointing file 78 is adjusted to bear against the teeth of the saw. The die of the setting mechanism is then moved to the proper position by means of the adjusting screw 67, and the sharpening mechanism is brought to the desired position by means of the adjusting screw 50. The link 76 is then connected with the proper opening 77, in the bell crank arm 20, to give a movement to the carriage conforming to the spacing of the teeth of the saw to be sharpened, and the frame 36, which carries the bearings 35, is adjusted through the notched lever 37, to bring the file to the proper vertical angle to conform to the angular position of the teeth of the saw. The machine is now ready for operation.

In operation, the saw is firmly clamped in place on the carriage, and the latter is reciprocated with the teeth bearing against file 78, until the teeth are dressed to uniform length. The file is then moved back and the pawls reengaged with the carriage. The operator now presses down upon the lever 59, so as to cause the saw-setting mechanism to hold the saw and operate upon the first tooth. Upon throwing the lever back the slide 16 is actuated through the link 76, and bell crank arms 20 and 18, so as to cause the pawls 15 to advance the carriage the distance of one saw tooth. This operation is continued until the teeth of the saw have been successively advanced to a point where they may be engaged by the file 41. When this point is reached, before the saw is released by the saw-setting mechanism, the operator rotates the drive shaft 28, through the medium of the crank handle 29. This produces a two-fold action. First, the frame 36 is reciprocated vertically through the medium of the crank disk 30 and pitman 32, bringing the file first upwardly throughout its length, firmly in engagement with the saw tooth. Second, at completion of its above mentioned longitudinal movement, the file is moved backwardly, away from the saw, by means of the cam 49 acting upon the frame 45, and moving the same against the tension of its spring 47 and thereby rocking the rod 34 axially in its bearings 35, by reason of the engagement of said frame with the fin-like extension 43. This dual operation is repeated as many times as it may be desired to move the file along the tooth, after which the lever 59 is raised, and the carriage advanced the distance of one more tooth, through the intervening feed mechanism. The setting and sharpening operations are then alternately continued until all of the teeth of the saw have been both set and sharpened. To return the carriage to its normal position after the foregoing operations have been completed, the lever 23 is swung to the left, as viewed in Figure 1, disengaging the pawls 15 from the teeth 14, whereupon the carriage may be moved back by hand to a position to receive another tool to be operated upon.

The advantages of the invention will be readily apparent to those skilled in the art to which it appertains. It will be seen that by means of the invention simple and efficient means is provided which is so arranged that the file will automatically clear the tooth after each operation, thereby avoiding interference with the feeding of the saw. It will also be noted that simple and efficient mechanism is provided for setting the teeth of the saw, and simultaneously controlling the feed of the saw carriage with respect to the various mechanisms arranged to operate thereon. An important advantage is that the sharpening and setting mechanisms are independently adjustable, so that they may be made to conform to saw teeth of different styles and dimensions, and the feeding mechanism for the saw carriage is so constructed that it may also be adjusted to meet the same conditions.

Having thus explained the nature of the invention and described an operative manner of constructing and using the same, although without attempting to set forth all of the forms in which it may be made, or all of the forms of its use, what is claimed is:—

1. A saw sharpening machine comprising a guide frame, a longitudinally reciprocable rock shaft mounted in said frame, means movably mounted in and guided by said frame for reciprocating said rock shaft, a file carrier frame rigidly secured to said rock shaft, and means engaging said file carrier frame to oscillate said rock shaft during reciprocation thereof in one direction.

2. A saw sharpening machine comprising a guide frame, a longitudinally reciprocable rock shaft mounted in said frame, a crosshead guided by said frame and connected with said rock shaft, means engaging said cross-head to reciprocate said frame, a file carrier frame rigidly secured to said rock shaft, and means engaging said file carrier frame to oscillate said rock shaft during reciprocation thereof in one direction.

3. A saw sharpening machine comprising a guide frame, a longitudinally reciprocable rock shaft mounted in said frame, a file carrier frame rigidly secured to said rock shaft, means engaging said file carrier frame to oscillate said rock shaft during reciprocation thereof in one direction, and means for varying the angular position of said guide frame.

4. A saw sharpening machine comprising a pivoted guide frame, locking means for normally holding said frame against pivotal movement, said locking means being adjustable to vary the angular position of said frame, a longitudinally reciprocable rock shaft mounted in said frame, means for reciprocating said rock shaft, a file carrier frame rigidly secured to said rock shaft, and means engaging said file carrier arm to oscillate said rock shaft during reciprocation thereof in one direction.

5. A saw sharpening machine comprising a guide frame, an adjustable bar lever attached to said frame, means for holding said lever in various adjusted positions, a longitudinally reciprocable rock shaft mounted in said frame, means for reciprocating said shaft, a file carrier frame rigidly secured to said rock shaft, and means engaging said file carrier frame to oscillate the rock shaft during the reciprocation thereof in one direction.

6. A saw sharpening machine comprising a guide frame, a rotatably mounted crank disk, means for rotating said disk, connecting means between said disk and said frame, a longitudinally reciprocable rock shaft mounted in said frame, means movably mounted in and guided by said frame for reciprocating said rock shaft, means for reciprocating said shaft, a file carrier frame rigidly secured to said rock shaft, and means engaging said file carrier frame to oscillate said rock shaft during reciprocation thereof in one direction.

7. A saw sharpening machine comprising a file-carrying frame provided with a rearwardly extended fin, an arm engaging said fin, means for vertically reciprocating said frame with respect to said arm, and means for periodically imparting lateral movement to said arm.

8. A saw sharpening machine comprising a file-carrying frame, means for imparting longitudinal reciprocations to said frame, an arm having one end in direct normal engagement with said frame during reciprocations thereof, and cam operating means for imparting lateral reciprocations to said arm.

9. A saw sharpening machine comprising a file-frame provided with a fin, means imparting vertical reciprocations to said file-carrying frame, a laterally reciprocable arm slidably engaging said fin, and means periodically reciprocating said arm.

10. A saw sharpening machine comprising a file-carrying frame provided with a fin, means imparting vertical reciprocations to said file-carrying frame, a laterally reciprocable cam frame having a forked arm slidably engaging said fin, and means periodically operating said cam frame.

11. A saw sharpening machine comprising a file-carrying frame, means imparting vertical reciprocations thereto, a cam frame support, a cam frame mounted to reciprocate laterally in said support and having means engaging said file-carrying frame, and means periodically operating said cam frame.

12. A saw sharpening machine comprising a file-carrying frame, means imparting vertical reciprocations thereto, a reciprocable cam frame having means slidably engaging the file-carrying frame, a rotatable cam periodically actuating said cam frame, and means whereby said cam may be actuated.

13. A saw sharpening machine comprising a file-carrying frame, means imparting vertical reciprocations thereto, a cam frame support, a frame mounted to reciprocate laterally in said support, a rotatable cam also mounted in said support independent of the cam frame and engaging the said cam frame, and means whereby the cam may be actuated.

14. A saw sharpening machine comprising a rotatably supported cam shaft, a guide frame, means operated by said cam shaft to reciprocate said guide frame, a longitudinally reciprocable rock shaft mounted in said frame, means for reciprocating said shaft, a file carrier frame rigidly secured to said rock shaft, and means operated by said cam and engaging said file carrier frame to oscillate said rock shaft during reciprocation thereof in one direction.

15. A saw sharpening machine comprising a guide frame, a longitudinally reciprocable rock shaft mounted in said frame, means for reciprocating said shaft, a file carrier frame rigidly secured to said rock shaft, means holding said frame in a normal lateral position during reciprocation thereof in one direction, and means engaging said file carrier frame to oscillate said rocking shaft at the end of said reciprocation in one direction.

16. A saw sharpening machine comprising a guide frame, a longitudinally reciprocable rock shaft mounted in said frame, means for reciprocating said rock shaft, a file carrier frame rigidly secured to said rock shaft, a spring pressed member holding the file carrier frame in a normal lateral position during reciprocation of said shaft in one direction, and means periodically moving said spring-pressed member against the tension of the spring pressure exerted thereon.

17. A saw sharpening machine comprising a guide frame, a longitudinally reciprocable rock shaft mounted in said frame, means for imparting reciprocations to said rock shaft, a file carrier frame rigidly secured to said rock shaft, a spring-pressed member holding said file carrier frame in a normal lateral position during reciprocation of said shaft in one direction, a cam shaft, and means operated by said cam shaft for moving said spring-pressed member against the tension of the spring pressure exerted thereon.

18. A saw sharpening machine comprising a guide frame provided with bearings, a rock shaft mounted to reciprocate longitudinally within said bearings, means for reciprocating said rock shaft, a file carrier frame rigidly secured to said rock shaft, a spring pressed member normally holding said file carrier frame in a lateral position during reciprocation of said shaft in one direction, and means oscillating said file carrier frame upon said shaft as an axis at the end of its reciprocation in one direction.

19. A saw sharpening machine comprising a bearing frame, a file-carrying frame having a rod engaging said bearing frame, means reciprocating said file-carrying frame vertically with respect to said bearing frame, means periodically oscillating said file-carryframe in said bearing frame, and means for varying the angle of vertical movement of said file-carrying frame.

20. A saw sharpening machine comprising a bearing frame, a file-carrying frame having a rod engaging said bearing frame, means reciprocating said file-carrying frame vertically with respect to said bearing frame, means periodically oscillating said file-carrying frame in said bearing frame, means pivotally supporting said bearing frame, and means whereby the angular position of said bearing frame may be varied.

21. A saw sharpening machine comprising a support, a saw-set-carrier pivotally connected at one end to said support and free at the other end, means yieldably sustaining the free end of said carrier in a normally elevated position, an actuating lever located above and engaging the free end of the carrier and provided with an upstanding arm, and an operating lever pivoted at a fixed position above said actuating lever and connected with said upstanding arm.

22. A saw sharpening machine comprising a support, a saw-set carrier pivotally connected at one end to said support and free at the other end, means yieldably sustaining the free end of said carrier in a normally elevated position, an actuating lever engaging the free end of the carrier and provided with an upstanding arm, an operating lever pivoted at a fixed position and connected with said upstanding arm, a stop arm movably connected with said actuating lever, and an operating-lever-stop adjustably mounted on said stop arm.

23. A saw sharpening machine comprising a support, a saw-set-carrier yieldably mounted thereon, a die-plate cooperating with said carrier, an adjusting screw mounted in said support and engaging said die-plate, an actuating lever engaging said carrier, and means operating said lever.

24. A saw sharpening machine comprising a saw carriage, a support, a saw-set-carrier yieldably mounted on said support, an actuating lever engaging said carrier, a second lever for operating said actuating lever, and means connected with said actuating lever for imparting movement to said carriage.

25. A saw sharpening machine comprising a saw carriage, a support, a saw-set-carrier yieldably mounted thereon, an actuating lever engaging said carrier, an operating arm movable with said lever, means actuated by said operating arm for imparting movements to said carriage, and means operating said lever.

26. A saw sharpening machine comprising a saw carriage, a support, a saw-set-carrier yieldably mounted thereon, an actuating lever engaging said carrier, a slide actuated by said lever, means operated by said slide for feeding said carriage, and means for operating said lever.

27. A saw sharpening machine comprising a saw carriage, a support, a saw-set-carrier yieldably mounted on said support, an actuating lever engaging said carrier, an operating arm movable with said lever, a slide operatively connected with said operating arm, means actuated by said slide for feeding the carriage, and means for operating said actuating lever.

28. A saw sharpening machine comprising a saw carriage, a support, a saw-set-carrier yieldably mounted on said support, an actuating lever engaging said carrier, a lever for operating said actuating lever, means actuated by said operating lever for imparting movement to said carriage, and means for varying the extent of movement of the carriage.

29. A saw sharpening machine comprising a saw carriage, a support, a saw-set-carrier yieldably mounted thereon, an actuating lever engaging said carrier, an operating arm movable with said lever, means actuated by said operating arm for imparting movements to said carriage, means operating said lever, and means for varying the extent of movement of the carriage.

30. A saw sharpening machine comprising a saw carriage, a support, a saw-set-carrier yieldably mounted on said support, an actuating lever engaging said carrier, a slide actuated by said lever, a carriage feed device, a link connecting said slide with said carriage feed device, means whereby the extent of movement of the carriage feed device may be varied, and means for operating said actuating lever.

31. In a saw sharpening machine a saw carriage, a carriage feeding slide, actuating pawls mounted on said slide and engaging said carriage, a bell crank lever connected with said slide, means for actuating said bell crank lever, and means whereby connection between the bell crank lever and the slide may be adjusted so as to vary the extent of throw of said slide.

32. In a saw sharpening machine a saw carriage, a carriage feeding slide, pawls operatively connected with said slide, a spring acting against said slide, and means for operatively moving the slide in opposition to the tension of said spring.

33. In a saw sharpening machine a saw carriage, a carriage feeding slide to which said pawls are operatively connected, a spring acting against said slide, means for operatively moving the slide in opposition to the tension of said spring, and means for varying the extent of movement in opposition to the spring.

34. In a saw sharpening machine a carriage, a carriage feeding slide, a spring acting against one end of said slide, a bell crank lever connected to the other end of the slide, actuating pawls operatively connected with said slide, and means for actuating said bell crank lever.

35. In a saw sharpening machine a carriage, a carriage feeding slide, actuating pawls mounted on said slide, means for reciprocating said slide, means for varying the extent of reciprocation of the slide, and means whereby the actuating pawls may be temporarily moved to inoperative position.

36. In a saw sharpening machine a carriage, a carriage feeding slide, actuating pawls mounted on said slide, means for reciprocating said slide, means for varying the extent of reciprocation of the slide, a disengaging slide having projections positioned to engage said pawls, and a lever for moving said disengaging slide.

In testimony whereof we have hereunto set our hands.

OTHO H. FLETCHER.
JAMES A. TENNEY.